(12) United States Patent
Purvis, IV

(10) Patent No.: US 7,147,184 B1
(45) Date of Patent: Dec. 12, 2006

(54) AERODYNAMIC FAIRING SYSTEM FOR AIRSHIP

(75) Inventor: John Whitefield Meade Purvis, IV, Littleton, CO (US)

(73) Assignee: Sierra Nevada Corporation, Sparks, NV (US)

( * ) Notice: Subject to any disclaimer, the term of this patent is extended or adjusted under 35 U.S.C. 154(b) by 0 days.

(21) Appl. No.: 11/264,275

(22) Filed: Nov. 1, 2005

Related U.S. Application Data

(60) Provisional application No. 60/710,786, filed on Aug. 24, 2005.

(51) Int. Cl.
*B64B 1/02* (2006.01)

(52) U.S. Cl. .................. 244/24; 244/30; 244/123.11; 244/125

(58) Field of Classification Search ............... 244/24, 244/25, 30, 31, 123.11, 125, 49
See application file for complete search history.

(56) References Cited

U.S. PATENT DOCUMENTS

| | | | | |
|---|---|---|---|---|
| 4,050,653 A | * | 9/1977 | Sayers | 244/32 |
| 4,995,572 A | * | 2/1991 | Piasecki | 244/2 |
| 5,358,200 A | * | 10/1994 | Onda | 244/96 |
| 6,655,206 B1 | * | 12/2003 | Barat | 73/170.01 |
| 6,793,180 B1 | * | 9/2004 | Nachbar et al. | 244/125 |
| 2003/0071168 A1 | * | 4/2003 | Barnes, III | 244/30 |

* cited by examiner

Primary Examiner—J. Woodrow Eldred
(74) Attorney, Agent, or Firm—Klein O'Neill & Singh, LLP; Howard J. Klein

(57) ABSTRACT

An aerodynamic fairing system for an airship having a substantially spherical balloon portion includes an inflatable fairing that is attachable to the balloon portion, and a fairing actuation mechanism that selectively inflates and deploys the fairing after lift-off, and deflates and retracts the fairing before landing. The actuation mechanism includes an inflation/deflation mechanism and a deployment/retraction mechanism that cooperate to deploy and inflate the fairing, and to deflate and retract the fairing. The fairing includes a substantially conical, inflatable tail section tapering from a wide forward end to a narrow aft end, and a collapsible annular collar connecting the forward end of the tail section to the balloon portion. The inflation/deflation mechanism includes a fan system in the tail section, and the deployment/retraction mechanism includes a plurality of cables attached between the tail section and a plurality of winches mounted on the balloon portion.

20 Claims, 5 Drawing Sheets

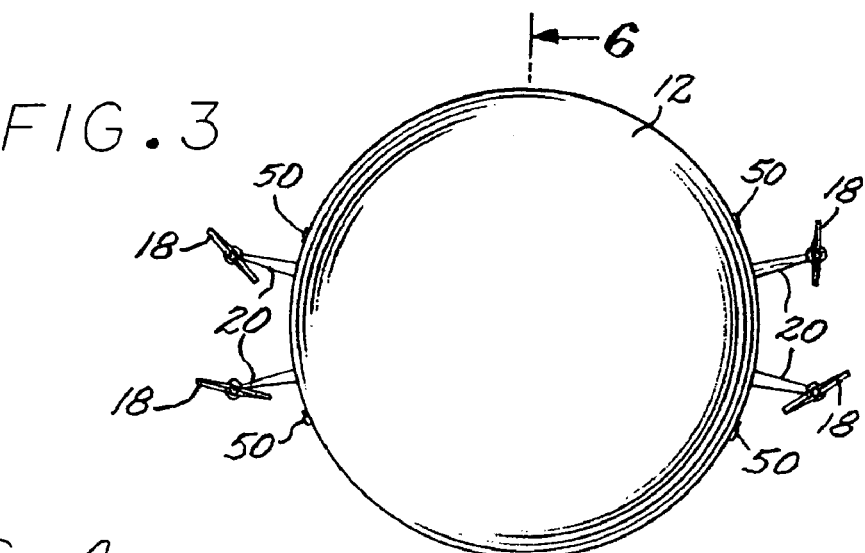
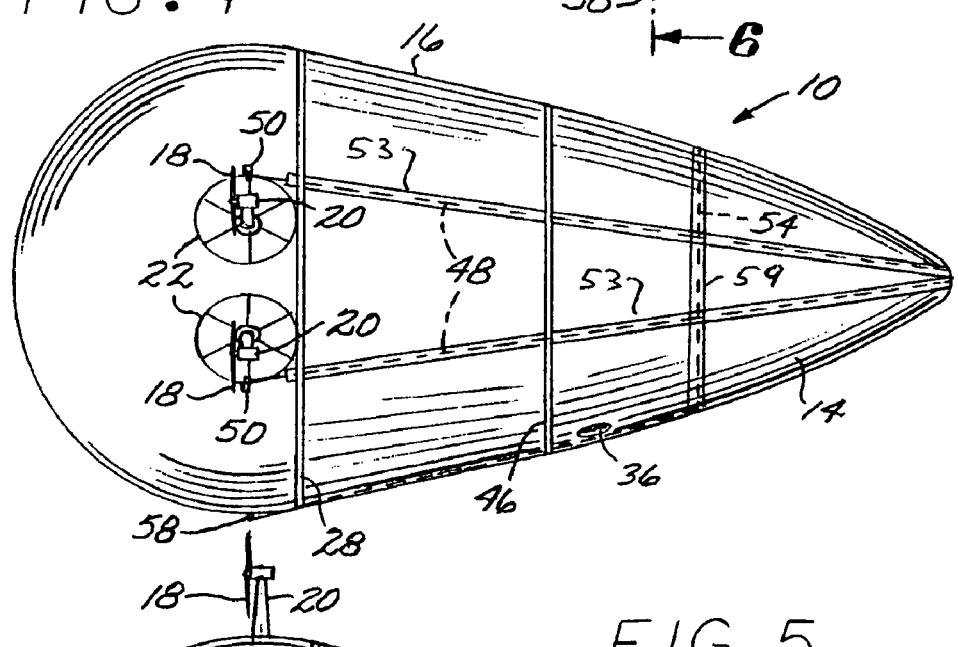
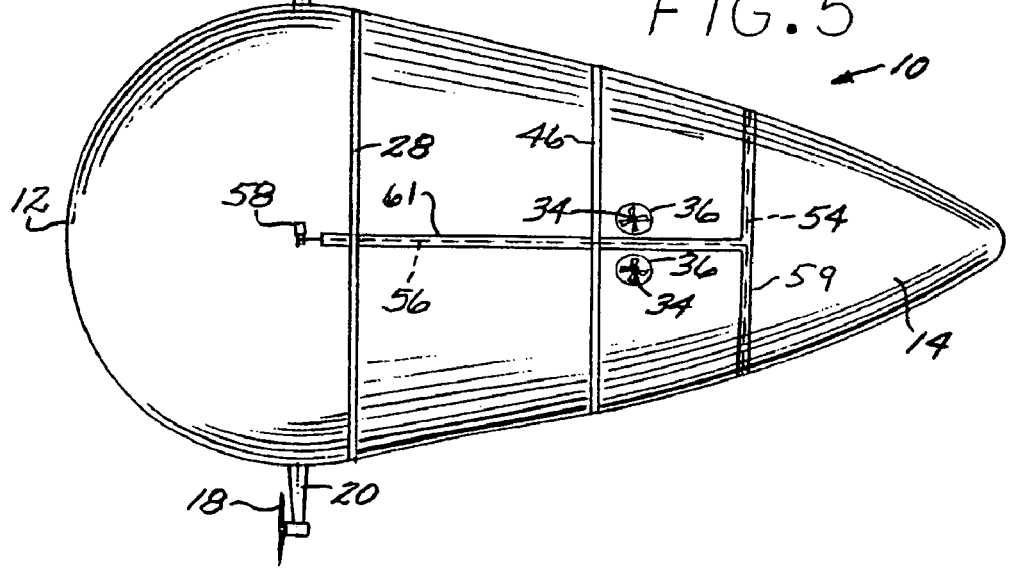

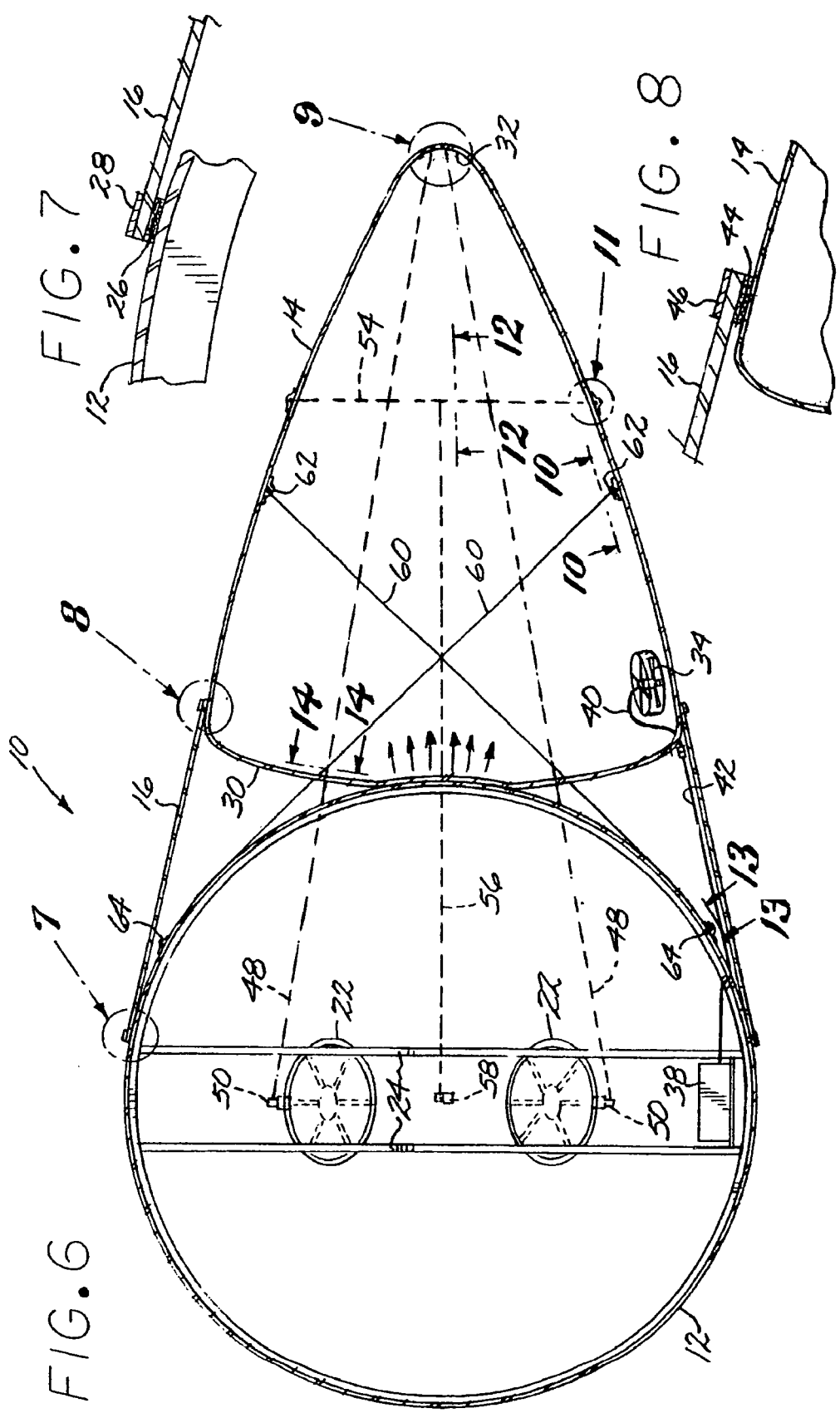

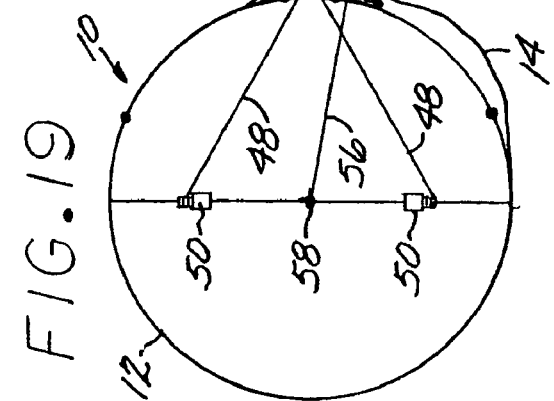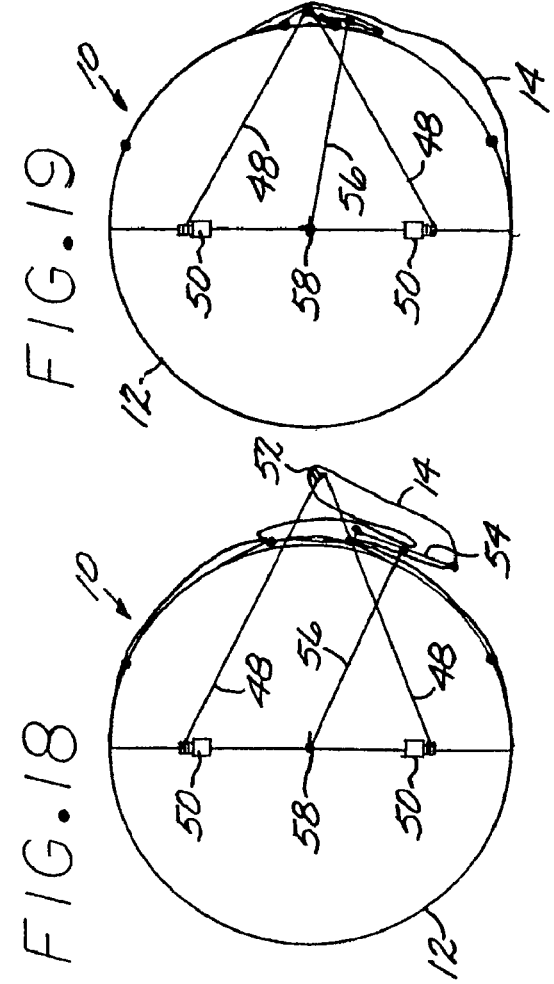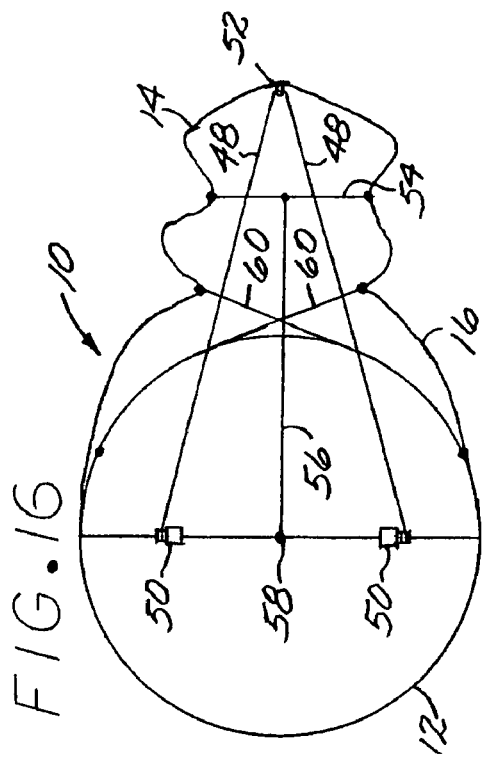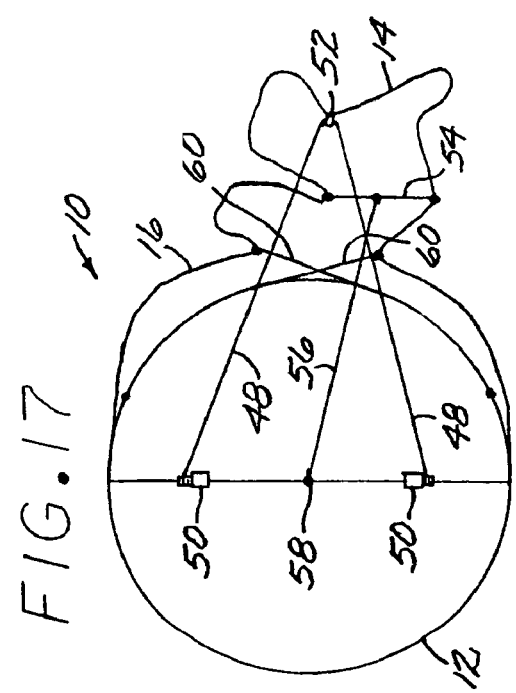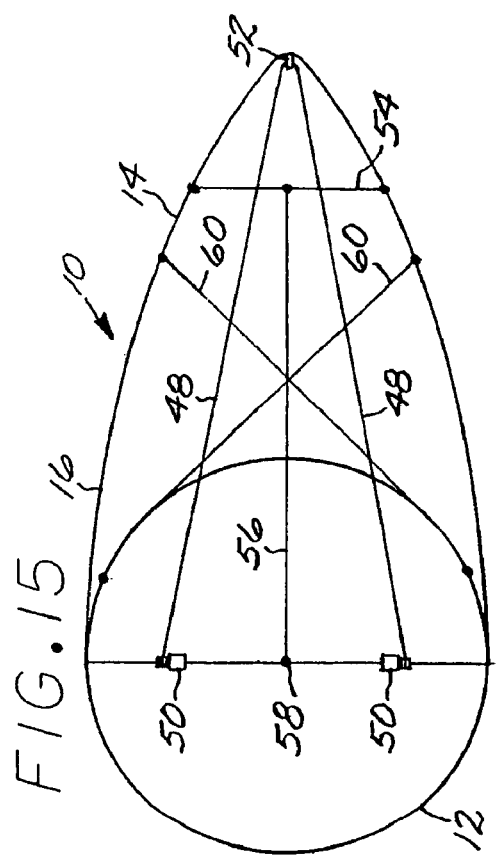

US 7,147,184 B1

AERODYNAMIC FAIRING SYSTEM FOR AIRSHIP

CROSS-REFERENCE TO RELATED APPLICATIONS

This application claims the benefit, under 35 U.S.C. §119(e), of co-pending provisional application No. 60/710,786; filed Aug. 24, 2005, the disclosure of which is incorporated herein by reference.

FEDERALLY-SPONSORED RESEARCH OR DEVELOPMENT

Not Applicable

BACKGROUND OF THE INVENTION

The present invention relates to powered lighter-than-air aircraft or airships. More specifically, it relates to an aerodynamic fairing for an airship that is selectively deployable and retractable while the craft is aloft.

Powered lighter-than-air aircraft, or airships, have been in existence for more than a century. Typically, such aircraft fall into two major classes: dirigibles and blimps. The major difference between the two is that in the former, the inflatable chambers or balloons are supported in a rigid framework or support structure, while the latter lack a rigid support structure. In both types, the overall shape of the craft typically resembles a cigar, i.e., elongate, with a circular cross-section, a rounded bow or nose, and a stern or tail that is tapered or pointed. This elongate shape provides greater aerodynamic efficiency as compared with, for example, a spherical shape, allowing greater altitude, speed, and endurance (due to improved fuel efficiency) for a given propulsion system. These advantages are achieved, however, at some cost in the efficiency of the distribution of internal and external gas pressures, thereby requiring a more complex pressurization system that would be necessary in a spherical craft. Furthermore, a spherical craft would simplify ground operations, by requiring a smaller landing/lift-off area without the need for a mooring pylon.

It would therefore be advantageous to provide an airship that combines, to the greatest extend possible, the aerodynamic advantages of a conventional, elongate airship with the above-mentioned advantages of a spherical craft. To this end, the prior art has proposed various types of aerodynamic structures and fitting that can be attached to an airship or balloon to improve its aerodynamic efficiency. Nevertheless, it would be a great improvement in airship technology to provide an aerodynamic structure that can be attached to a spherical craft and that can be easily deployed and retracted while the craft is aloft, so that the craft can lift off and land in the manner of a spherical balloon, while greatly increasing aerodynamic efficiency while the craft is in flight.

SUMMARY OF THE INVENTION

Broadly, the present invention, in one aspect, is an aerodynamic fairing system for an airship comprising a substantially spherical balloon, wherein the system includes an inflatable fairing that is attachable to the balloon, and a fairing actuation mechanism for selectively inflating and deploying the fairing after lift-off and deflating and retracting the fairing before landing. More specifically, the actuation mechanism includes an inflation/deflation mechanism and a deployment/retraction mechanism that cooperate to deploy and inflate the fairing after lift-off, and to deflate and retract the fairing before landing.

In another aspect, the present invention is a powered airship, comprising a substantially spherical balloon containing a lighter-than-air gas (e.g., helium), an inflatable fairing attached to the balloon, a fairing actuation mechanism for selectively inflating and deploying the fairing after lift-off and deflating and retracting the fairing before landing. More specifically, the actuation mechanism includes an inflation/deflation mechanism and a deployment/retraction mechanism that cooperate to deploy and inflate the fairing after lift-off, and to deflate and retract the fairing before landing.

In either of the above-described aspects of the invention, the fairing comprises an inflatable, substantially conical, tail section that is removably attached to the balloon by an annular collar. The inflation/deflation mechanism comprises at least one inflation/deflation fan, and preferably two or more inflation/deflation fans. Each fan is operable in an inflation mode to inflate the tail section to a desired pressure in a fully inflated configuration, and in a deflation mode to deflate the tail section. The deployment/retraction mechanism comprises a plurality of cables, each of which is spooled on a winch secured to the balloon, and each of which has a distal end secured to the tail section.

To deploy the fairing, the inflation/deflation fans are operated in the inflation mode while the winches on the balloon are operated in a deployment mode to spool out the chords as the tail section inflates to a fully inflated configuration. To retract the fairing, the process is reversed: The fans are operated in a deflation mode to deflate the tail section while the winches are operated in a retraction mode to reel in the chords, thereby collapsing and retracting the tail section as it deflates.

The fairing system of the present invention improves the aerodynamic efficiency of the airship by increasing the ratio of the length of the airship to its maximum diameter (i.e., the "fineness ratio"). The fineness ratio is inversely proportional to the coefficient of drag ($C_D$). Thus, a spherical balloon has a fineness ratio of 1.0, which corresponds to a $C_D$ of 0.2. By adding a tail section to the balloon, the present invention increases the fineness ratio to about 2.0, yielding a $C_D$ of about 0.03. With the coefficient of drag so reduced, the speed and endurance of the airship are markedly increased.

As will be more apparent from the detailed description that follows, the present invention provides an airship that can lift off and land substantially in the manner of a spherical balloon, but that possesses aerodynamic qualities and advantages similar to those of a conventional, elongate airship while in powered flight. This combination of the advantages of a spherical craft and an elongate craft is achieved with a fairing system that can be attached to almost any spherical airship, and that can be conveniently and easily deployed after lift-off, retracted before landing, and removed after landing. These and other attributes, characteristics, and advantages of the present invention will be readily understood and appreciated from the detailed description that follows.

BRIEF DESCRIPTION OF THE DRAWINGS

FIG. 3 is a front elevational view of the airship of FIG. 1;

FIG. 4 is a side elevational view of the airship of FIG. 1;

FIG. 5 is a bottom plan view of the airship of FIG. 1;

FIG. 6 is a cross-sectional view taken along line 6—6 of FIG. 3;

FIG. 7 is an enlarged, detailed view of the area within the dashed circle designated by the numeral 7 in FIG. 6;

FIG. 8 is an enlarged, detailed view of the area within the dashed circle designated by the numeral 8 in FIG. 6;

FIGS. 15–19 are schematic views of the airship of FIG. 1, showing the transition of the tail section and collar of the fairing system from a fully deployed configuration to a fully retracted and collapsed configuration.

DETAILED DESCRIPTION OF THE INVENTION

Figure 1:
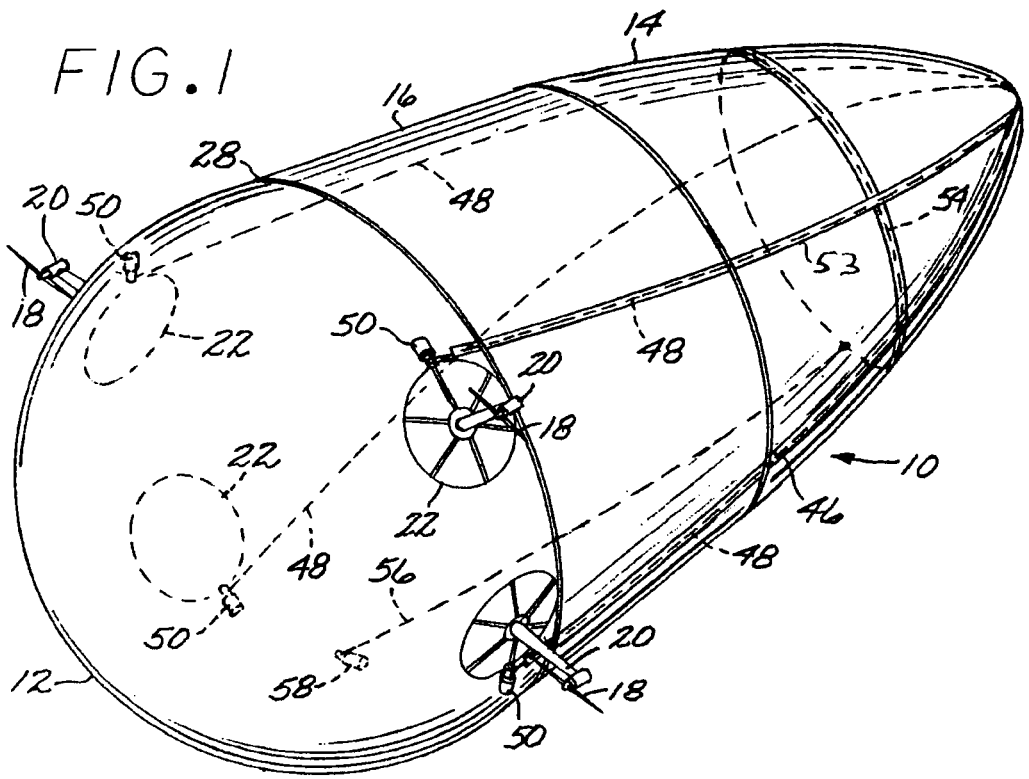
FIG. 1 is a perspective view of an airship with a fairing system in accordance with a preferred embodiment of the present invention, wherein the tail section of the fairing system is in its deployed and inflated configuration.
Figure 2:
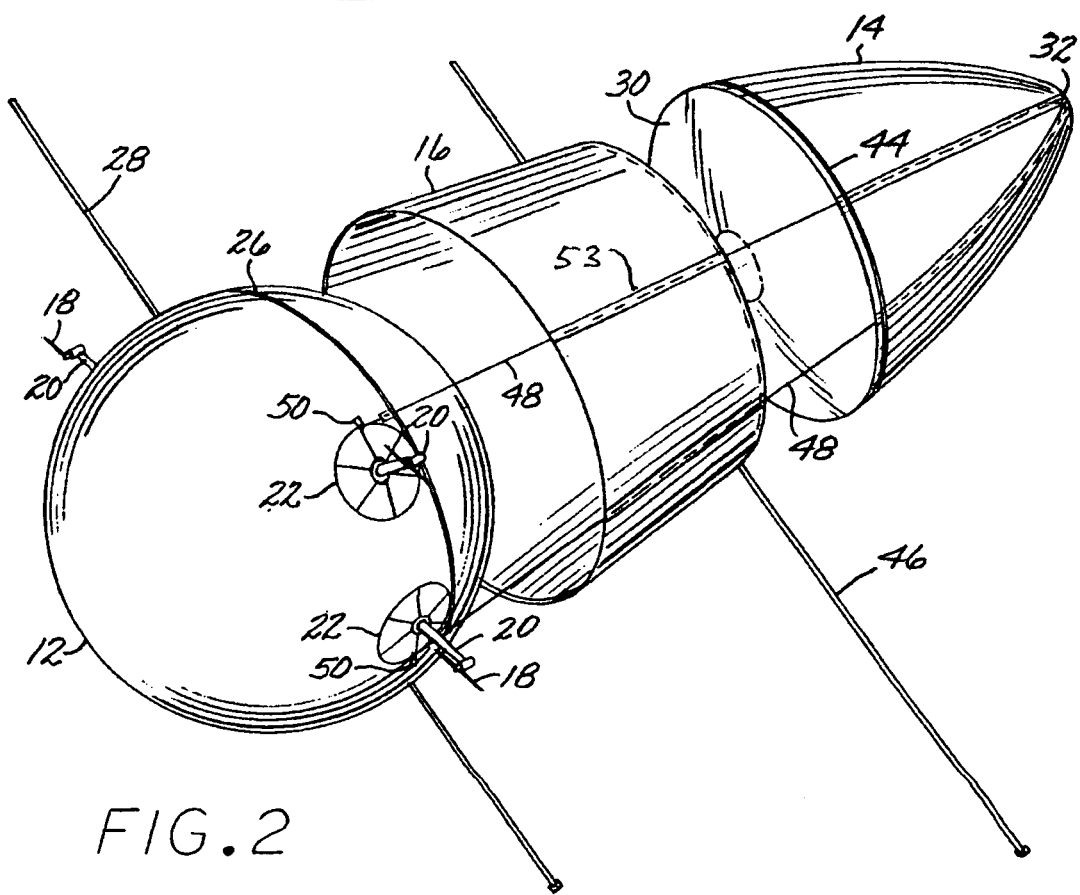
FIG. 2 is an exploded perspective view of the airship of FIG. 1, showing the tail section and the attachment collar of the fairing system of the present invention, separated from the main balloon portion of the airship.

Referring now to the drawings, an airship 10 having a fairing system in accordance with the present invention is shown. The airship 10 comprises a main balloon portion 12 and a fairing system that, in turn, comprises an inflatable, substantially conical tail section 14 and a substantially annular attachment collar 16. The balloon portion 12 is equipped with a propulsion system comprising a plurality of motor-driven propellers 18, each mounted on a propeller pylon 20 fixed to a support 22 on the outer surface of the balloon portion 12. The pylon supports 22, in turn, are mounted on a mounting ring 24 (FIG. 6) that encircles the equatorial circumference of the balloon portion 12. In a preferred embodiment, as illustrated, there are four propellers 18, two on each side of the balloon portion 12, but the total number of propellers may be greater than four or as few as two.

The annular collar 16 has a substantially frustoconical configuration, with a first or forward circumference that is slightly smaller than the circumference of the balloon portion 12, and a second or aft circumference that is somewhat smaller than the forward circumference thereof. Thus, the forward part of the collar 16 fits around the balloon portion 12 just aft of the engine mounting ring 24. The collar 16 is made of a lightweight, durable, moisture-proof fabric, preferably a urethane-coated nylon, such as the fabric marketed under the trademark "NORLITE 50" by North Sails North America (www.na.northsails.com). As shown in FIGS. 6 and 7, the collar 16 is removably attached to the balloon portion 12 by a first or forward fastening ring 26, which advantageously comprises mating rings of hook-and-loop fasteners, such as those marketed under the trademark VELCRO®, respectively attached to the adjoining surfaces of the balloon 12 and the collar 16. A first or forward cinch strap 28 may advantageously be removably fastened around the forward fastening ring 26 to provide a more secure attachment of the collar 16 to the balloon portion 12.

The inflatable tail section 14 is, when fully inflated, substantially conical in form, tapering from a substantially circular forward end 30, having a circumference substantially equal to the aft or second circumference of the collar 16, to a blunt or rounded apex at its rear-most or aft end 32. Also, when the tail section 14 is fully inflated, its forward end 30 bulges slightly outward, presenting an arcuate forward surface.

The tail section 14 is an inflatable gas chamber or envelope that is advantageously formed of the same material as the collar 16, as described above. An inner liner (not shown) of a gas impermeable material, such as urethane, may optionally be provided. The tail section 14 is designed to be inflated to a suitable pressure by a plurality of reversible, electrically-powered inflation/deflation fans 34 that are built into passages 36 in the tail section. The fans 34 are operable in an inflation mode to inflate the tail section 14 to a suitable pressure, which, in an exemplary embodiment of the invention, is about 6.35 mm $H_2O$. The fans 34 are operable in reverse to operate in a deflation mode when it is desired to deflate the tail section 14. The passages 36 include conventional gating or valving mechanisms (not shown) to close the passages 36 when the fans 34 are not in use. The fans 34 are preferably run by DC motors (not shown), which are powered by a DC power source 38 contained in the balloon portion 12, as shown in FIG. 6. Current from the power source 38, and control signals from a control unit (not shown) in the balloon portion 12, are conducted to the fan motors by suitable cables 40 (one of which is shown in FIG. 6), that may advantageously be run through one or more fabric sleeves 42 that may be sewn into the material of the collar 16, as also shown in FIG. 6.

As shown in FIGS. 6 and 8, the tail section 14 is removably attached to the collar 16 by a second or aft fastening ring 44, which advantageously comprises mating rings of hook-and-loop fasteners, such as those marketed under the trademark VELCRO®, respectively attached to the adjoining surfaces of the collar 16 and the tail section 14. A second or aft cinch strap 46 may advantageously be removably fastened around the aft fastening ring 44 to provide a more secure attachment of the tail section 14 to the collar 16. When the tail section 14 is attached to the collar 16 and is fully inflated, as shown in FIG. 6, the arcuate forward surface of the forward end 30 of the tail section 14 abuts against the spherical balloon portion 12. In a preferred embodiment of the invention, the inflation pressure of the tail section 14 is measurably less than that of the balloon portion 12, and therefore the abutment of the two components will result in a slight compression of the forward surface of the tail section 14. This compression produces a tensile force in the collar 16 that helps hold the tail section 14 in place.

Figure 9:
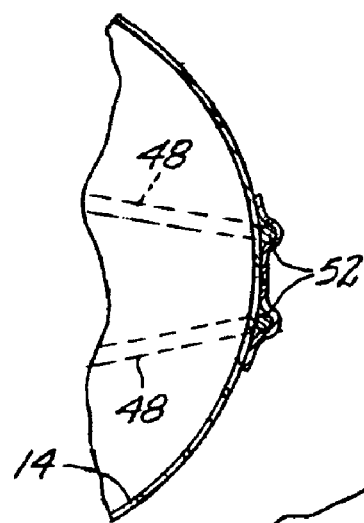
FIG. 9 is an enlarged, detailed view of the area within the dashed circle designated by the numeral 9 in FIG. 6.
Figure 11:
FIG. 11 is an enlarged, detailed view of the area within the dashed circle designated by the numeral 11 in FIG. 6.

The airship 10 further includes a fairing deployment/retraction mechanism, comprising at least one pair of longitudinal retraction cables 48, each driven by an electrically-powered main winch 50 mounted on the balloon portion on or near one of the pylon supports 22. Each of the longitudinal retraction cables 48, preferably nylon ropes or their equivalent, is run from one of the main winches 50 to an aft cable anchor 52 sewn into the tail section 14 at the aft end 32 thereof, as shown in FIG. 9. Specifically, a first end of each longitudinal retraction cable 48 is spooled onto its respective one of the main winches 50, and the longitudinal cable 48 is passed through an associated longitudinal fabric sleeve 53 that extends along the surface the collar 16 and the tail section 14, with the second end being attached to its associated aft cable anchor 52. The main winches 50 are operable in a deployment mode to spool out the longitudinal retraction cables 48, and in a retraction mode to reel them in, as explained in detail below. Preferably there are two pairs of main winches 50, one pair on each side of the balloon portion 12.

The deployment/retraction mechanism further comprises a circumferential retraction cable 54 that is connected by a linking cable segment 56 to a ventral winch 58 mounted on the surface of the balloon portion 12, as best shown in FIG. 5. The circumferential retraction cable 54 is enclosed in a circumferential sleeve 59 that encircles the tail section 14, while the linking cable segment 56 passes through a longitudinal ventral sleeve 61 that extends along the surface of the collar 16 and the tail section 14. The circumferential retraction cable 54, with its linking cable segment, operates as a "noose," as explained below, to collapse the tail section 14 radially when the ventral winch 58 is operated in a retraction mode to reel in the linking cable segment 56, and to allow the radial expansion of the tail section 14 when the ventral winch 58 is operated in a deployment mode to spool out the linking cable segment 56.

Figure 10:
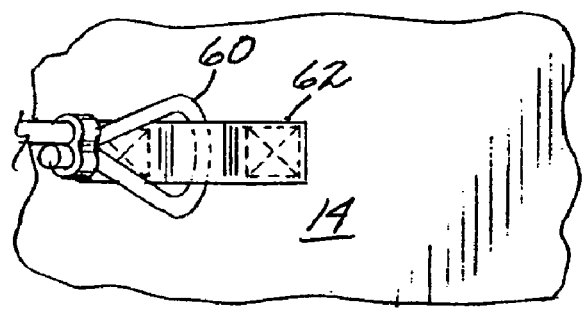
FIG. 10 is an elevational view of a portion of the interior side wall of the tail section of the airship of FIG. 1, taken along line 10—10 of FIG. 6.
Figure 12:
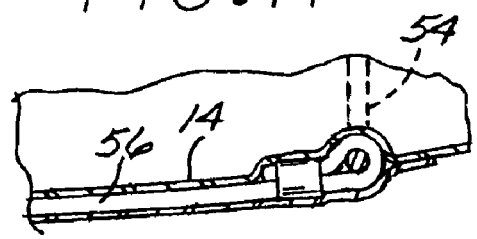
FIG. 12 is a cross-sectional view taken along line 12—12 of FIG. 6.
Figure 13:
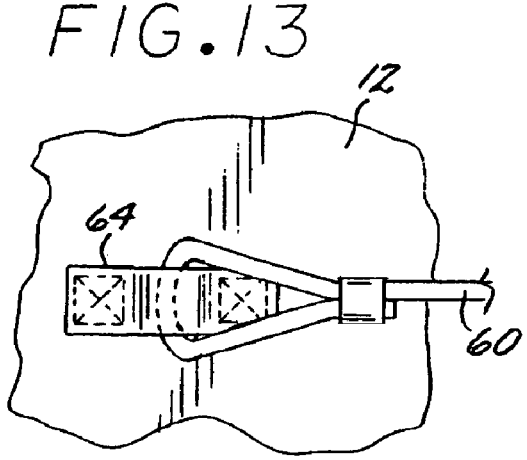
FIG. 13 is an elevational view of a portion of the exterior surface of the balloon portion of the airship of FIG. 1, taken along line 13—13 of FIG. 6.
Figure 14:
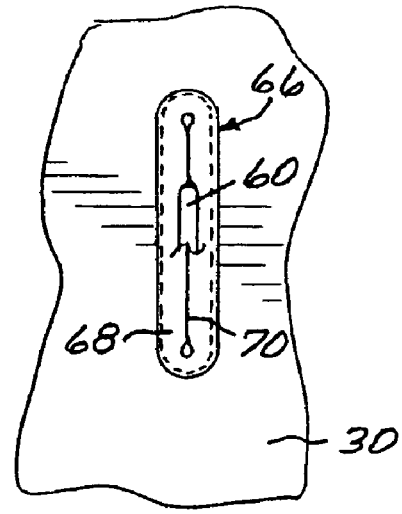
FIG. 14 is an elevational view of a portion of the forward interior surface of the tail section of the airship of FIG. 1, taken along line 14—14 of FIG. 6.

The deployment/retraction mechanism may also advantageously include a plurality of elastic chords, such as "bungee" chords, secured between the balloon portion 12 and the tail section 14 to assist in the retraction process. Specifically, as shown in FIG. 6, a plurality of diagonal elastic chords 60 may be secured between the exterior of the balloon portion 12 and the interior of the tail section 14. Each of the elastic chords 60 has a first end secured to a first anchor 62 (FIG. 10) that is fastened to the interior of the tail section 14, and a second anchor 64 (FIG. 13) fastened to the exterior of the balloon portion 12. Each of the chords 60 passes through a chord passage structure 66 (FIG. 14) sewn into the tail section 14, each of the chord passage structures 66 comprising an elastomeric membrane 68 having a slit 70 that resiliently closes around the chord 60 passing through it, so as to effect a nearly airtight seal around the chord 60.

In operation, the airship 10 lifts off much as a conventional spherical balloon, with the tail section 14 and collar 16 in a collapsed and retracted configuration (FIG. 19). After lift-off, the fans 34 are operated in their inflation mode, and the main winches 50 and the ventral winch 58 are operated in their deployment mode, spooling out the longitudinal retraction cables 48 and the linking cable segment 56 of the circumferential retraction cable 54, respectively. With the longitudinal cables 48 spooling out, and the circumferential cable 54 being loosened by the spooling out of the linking cable segment 56, the resultant slack in the cables 48, 54 allows the tail section 14 to be expanded by inflation (against the elastic forces exerted by the chords 60) until the tail section 14 and the collar 16 assume their fully deployed configuration (FIG. 15). Once the desired backpressure is registered in the inflation system (by conventional pressure sensors, not shown, appropriately located in the tail section 14), the fans 34 are shut off (or operated intermittently in a pressure-maintenance mode), and any excess slack in the cables 48, 54 is taken up by their respective winches 50, 58. In the fully deployed configuration of FIG. 15, the airship 10 is ready for powered flight, with the tail section 14 providing an aerodynamic efficiency that is much improved over that of a spherical balloon, as discussed above.

When the airship 10 is ready to land, the fans are operated in their deflation mode, while the winches 50, 58 are operated in their retraction mode to reel in the longitudinal cable 48 and to tighten (radially contract) the circumferential cable 54. At the same time, the elastic chords 60 exert a retraction force that urges the tail section 14 toward the balloon portion 12. Thus, as shown in FIGS. 16, 17, and 18, the tail section 14 and the collar 16 are drawn toward the balloon portion 12 and are collapsed against it, until the fully retracted configuration shown in FIG. 19 is achieved. Thus, the airship 10 may land in the manner of a conventional spherical balloon.

While a preferred embodiment of the invention has been described above, in conjunction with the drawings, it is to be understood that this embodiment is exemplary only, and represents the best mode currently contemplated for practicing the invention. A number of variations and modifications may suggest themselves to those skilled in the pertinent arts, and equivalent structures and elements will be found for many of the elements and structures described with particularity herein will. For example, the present invention will be readily adaptable to airships having a variety of propulsions systems. In addition, the system of cables, winches and chords described above for deploying and retracting the fairing components (the collar 16 and tail section 14) is by way of example only, and other equivalent structures for performing the deployment/retraction function will suggest themselves to those skilled in the pertinent arts. These and other variations and modifications are considered to be within the spirit and scope of the present invention, as defined in the claims that follow.

What is claimed is:

1. A fairing structure for attachment to a substantially spherical airship, the fairing structure comprising:
    a substantially conical, inflatable tail section tapering from a wide forward end to a narrow aft end;
    a collapsible annular collar connecting the forward end of the tail section to the airship; and
    a fairing actuation mechanism operatively associated with the tail section for selectively inflating and deploying the tail section after lift-off of the airship, and deflating and retracting the tail section before landing of the airship.

2. The fairing structure of claim 1, wherein the fairing actuation mechanism includes a fan mechanism that is operable to selectively inflate and deflate the tail section.

3. The fairing structure of claim 1, wherein the fairing actuation mechanism comprises:
    a plurality of winches mounted on the airship; and
    a plurality of cables attached between the tail section and the winches and operable by the winches selectively to allow the expansion of the tail section as it is being inflated, and to retract the tail section as it is being deflated.

4. The fairing structure of claim 3, wherein the fairing actuation mechanism comprises:
    first, second, and third winches mounted on the airship;
    a longitudinal cable extending between each of the first and second winches and the aft end of the tail section;
    a circumferential cable encircling the tail section; and
    a linking cable segment connecting the circumferential cable to the third winch.

5. The fairing structure of claim 3, wherein the fairing actuation mechanism further comprises a plurality of elastic chords connected between the airship and the tail section.

6. A powered airship, comprising:
    a substantially spherical balloon portion having an exterior surface;
    an inflatable fairing attached around the exterior surface of the balloon portion; and a fairing actuation mechanism for selectively inflating and deploying the fairing after lift-off of the airship, and deflating and retracting the fairing before landing of the airship.

7. The powered airship of claim 6, wherein the fairing comprises:
a substantially conical, inflatable tail section tapering from a wide forward end to a narrow aft end; and
a collapsible annular collar connecting the forward end of the tail section to the balloon portion.

8. The powered airship of claim 7, wherein the fairing actuation mechanism includes a fan mechanism in the tail section that is operable to selectively inflate and deflate the tail section.

9. The powered airship of claim 7, wherein the fairing actuation mechanism comprises:
a plurality of winches mounted on the balloon portion; and
a plurality of cables attached between the tail section and the winches and operable by the winches selectively to allow the expansion of the tail section as it is being inflated, and to retract the tail section as it is being deflated.

10. The powered airship of claim 9, wherein the fairing actuation mechanism comprises:
first, second, and third winches mounted on the balloon portion;
a longitudinal cable extending between each of the first and second winches and the aft end of the tail section;
a circumferential cable encircling the tail section; and
a linking cable segment connecting the circumferential cable to the third winch.

11. The powered airship of claim 9, wherein the fairing actuation mechanism further comprises a plurality of elastic chords connected between the balloon portion and the tail section.

12. A powered airship, comprising:
a balloon portion including a propulsion mechanism and having an exterior surface;
an inflatable fairing removably attached around the exterior surface of the balloon portion; and
a fairing actuation mechanism for selectively inflating and deploying the fairing after lift-off of the airship, and deflating and retracting the fairing before landing of the airship, wherein the fairing actuation mechanism comprises:
an inflation/deflation mechanism in the fairing that is operable to selectively inflate and deflate the fairing; and
a winch and cable mechanism connecting the balloon portion and the fairing, the winch and cable mechanism being selectively operable to deploy the fairing as it is inflated, and to retract the fairing as it is deflated.

13. The powered airship of claim 12, wherein the fairing comprises:
a substantially conical, inflatable tail section tapering from a wide forward end to a narrow aft end, wherein the tail section is selectively inflated and deflated by the inflation/deflation mechanism; and
a collapsible annular collar connecting the forward end of the tail section to the balloon portion.

14. The powered airship of claim 13, wherein the inflation/deflation mechanism includes a fan in the tail section that is operable to selectively inflate and deflate the tail section.

15. The powered airship of claim 13, wherein the winch and cable actuation mechanism comprises:
a plurality of winches mounted on the balloon portion; and
a plurality of cables attached between the tail section and the winches and operable by the winches selectively to allow the expansion of the tail section as it is being inflated, and to retract the tail section as it is being deflated.

16. The powered airship of claim 15, wherein the winch and cable mechanism comprises:
first, second, and third winches mounted on the balloon portion;
a longitudinal cable extending between each of the first and second winches and the aft end of the tail section;
a circumferential cable encircling the tail section; and
a linking cable segment connecting the circumferential cable to the third winch.

17. The powered airship of claim 15, wherein the winch and cable mechanism further comprises a plurality of elastic chords connected between the balloon portion and the tail section.

18. A method of deploying and retracting an inflatable aerodynamic fairing attached to a balloon portion of a powered airship, the method comprising the steps of:
a) providing a plurality of winches on the balloon portion, a cable attached between each of the winches and the fairing, and an inflation/deflation mechanism in the fairing;
b) deploying the fairing by inflating the fairing while the winches are operated to provide sufficient slack in the cables to allow the full inflation of the fairing; and
c) retracting the fairing by deflating the fairing while the winches are operated to pull in the cables so as to retract the fairing.

19. The method of claim 18, wherein the step of providing further comprises the providing of a plurality of elastic chords attached between the balloon portion and the fairing, wherein the deployment of the fairing is performed against elastic forces provided by the chords, and wherein the retracting of the fairing is assisted by the elastic force provided by the chords.

20. The method of claim 18, wherein the fairing comprises a substantially conical, inflatable tail section tapering from a wide forward end to a narrow aft end, and a collapsible annular collar connecting the forward end of the tail section to the balloon portion.

* * * * *